Aug. 28, 1923. 1,466,364
R. A. ILG
SELF COOLED ELECTRIC MOTOR
Filed Aug. 4, 1921
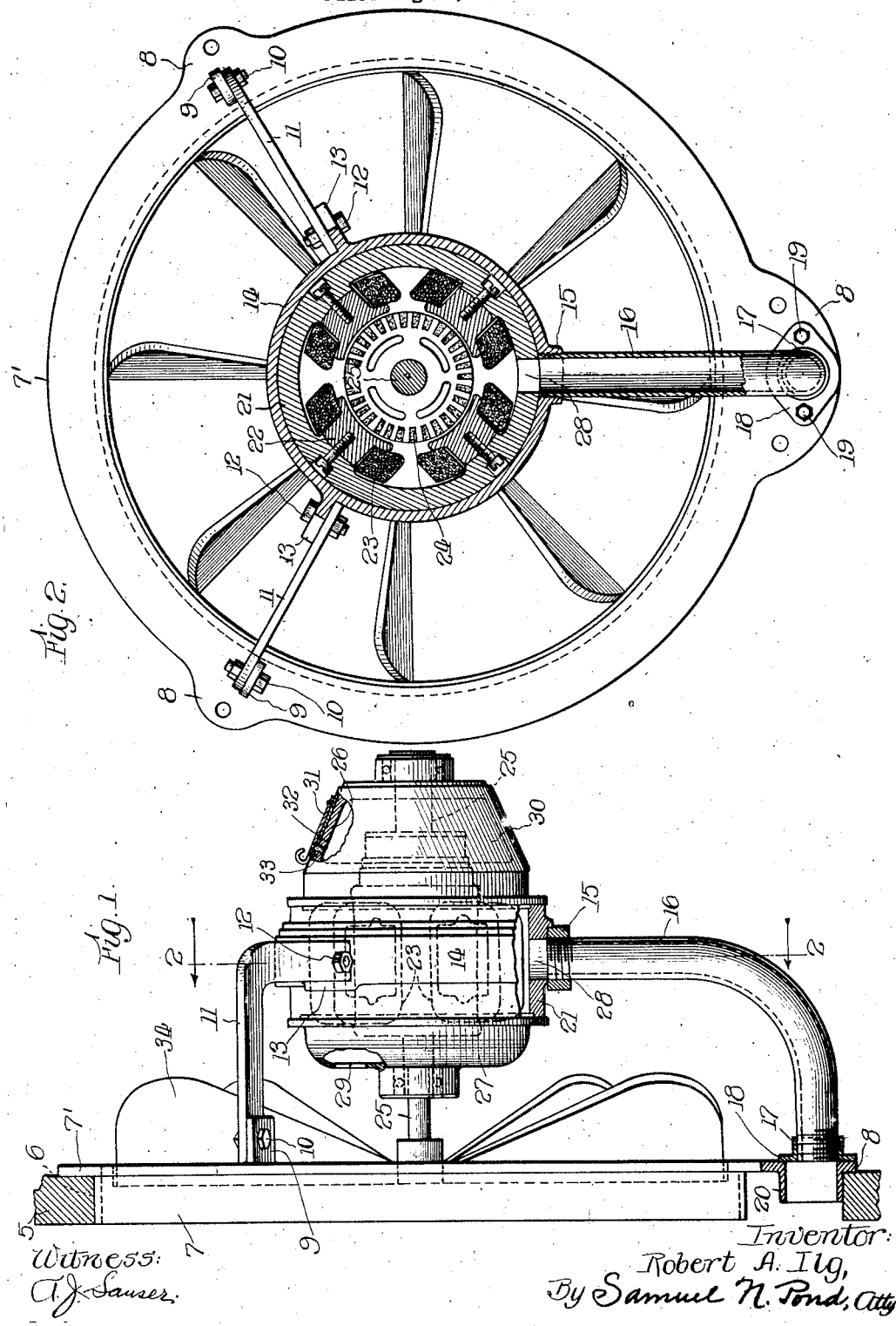
Inventor:
Robert A. Ilg,
By Samuel N. Pond, Atty
Witness:
T. J. Sauser.

Patented Aug. 28, 1923.

1,466,364

UNITED STATES PATENT OFFICE.

ROBERT A. ILG, OF CHICAGO, ILLINOIS, ASSIGNOR TO ILG ELECTRIC VENTILATING COMPANY, OF CHICAGO, ILLINOIS, A CORPORATION OF LOUISIANA.

SELF-COOLED ELECTRIC MOTOR.

Application filed August 4, 1921. Serial No. 489,685.

*To all whom it may concern:*

Be it known that I, ROBERT A. ILG, a citizen of the United States, residing at Chicago, in the county of Cook and State of Illinois, have invented certain new and useful Improvements in Self-Cooled Electric Motors, of which the following is a specification.

This invention relates to improvements in self-cooled electric motors. The present improvement is designed more particularly for use on electric motors used on direct driven fans and blowers, and embodies the same broad principle as that disclosed in my former Letters Patent No. 831,284, granted September 18, 1906. In the said patent there is shown an electric motor directly driving a ventilating fan, a hood completely enveloping the motor and open on the end thereof adjacent to the fan, and an air inlet pipe communicating with the hood and serving to admit a current of cooling air to the latter which flows over the motor and out through the open end of the hood, this cooling current of air being induced by the suction of the fan.

One object of the present invention is to improve the construction of my former patent, above identified, by leading the current of cooling air directly into the motor itself through the field of the latter so that it may not only circulate through the field, but may also impinge directly upon the rapidly revolving armature. A further object of the invention is to cheapen the construction of the motor supporting frame, and this is done by utilizing the pipe which conducts the cooling air into the motor as one of the radial supporting arms of the motor supporting ring or frame.

A still further object is to provide, in lieu of the hood heretofore used which envelopes the motor and its frame, a simplified and improved construction for closing the ends of the motor frame, except for an outflow opening at one end, so as to confine the induced air wholly to the internal parts of the motor, which most need cooling, and at the same time allow ready access to the commutator brushes.

My invention, its novel principles of operation, and the advantages inhering therein will be readily understood by persons familiar with the art from the following detailed description, taken in connection with the accompanying drawing in which I have illustrated one approved embodiment of the invention, and wherein—

Fig. 1 is a side elevation, partly in vertical section of my improved cooling device, shown applied to the motor and a direct driven electric ventilating fan; and Fig. 2 is a vertical section on the line 2—2 of Fig. 1, looking in the directions indicated by the arrows.

Referring to the drawing, 5 indicates a vertical wall in which is a circular opening 6, fitted to which is a ring 7 formed with a radial flange 7' which fits against the inner surface of the wall 5 surrounding the opening 6. On the periphery of the flange 7' are attaching lugs 8 apertured for the passage of fastening screws by which the ring is secured to the wall 5. On the outer face of the flange 7' are other lugs 9 to which are secured by bolts 10 the outer ends of a pair of elbow-shaped arms 11, the inner ends of which are secured by bolts 12 to radial lugs 13 formed on a motor supporting ring 14. The lower side of the ring 14 is formed with a tapped boss 15 in which is entered the upper threaded end of an elbow-shaped pipe 16. The lower horizontal end of the pipe 16 is threaded into a tapped sleeve 17 having a flange 18 apertured to receive fastening screws 19 by which said sleeve is secured to the face of the lower attaching lug 8. This latter at a point opposite the open end of the pipe 16 is formed with an opening registering with the latter, and this opening preferably consisting of the bore of a hollow boss 20 formed on the outer side of the attaching lug 8.

The motor itself embodies the usual and well-known structure of an electric motor, including the circular field frame 21 which is embraced by the ring 14, the pole pieces 22 attached to the field frame, the coils 23 encircling the pole piece 22, the armature designated as a whole by 24, and the armature shaft 25.

The outer end of the armature shaft 25 is journaled in an anti-friction bearing carried by a conical skeleton frame piece 26, one end of which is fitted and secured to one side of the circular field frame 21. The shaft 25 on the opposite end of the motor is journaled in anti-friction bearings in a cap or cover 27, that is similarly fitted and secured to the other side of the field frame 21. The lower side of the field frame 21 is formed with a radial opening 28 that registers with the upper end of the pipe 16, said opening 28 also registering with the space between a pair of adjacent field magnets, as clearly shown in Fig. 2, thereby providing a continuously open passage way through the pipe 16 of the motor supporting ring, and the field frame and magnets, to the surface of the armature.

In the upper portion of the cap or cover 27 there is formed an outflow opening 29 having substantially the cross-sectional area of the inflow pipe 16.

Surrounding and covering the major portion of the skeleton frame 26 is a conical sleeve 30 which completely covers the openings in said skeleton frame, said sleeve carrying a spring catch 31 formed with a locking pin 32 that, when the sleeve is in place snaps into a hole 33 in the frame 26 and thus locks the covering sleeve in place. By reason of the described construction, the internal parts of the motor are completely housed or enclosed except for the opening 28 which communicates with the pipe 16 and the opening 29 which leads into the space directly behind a ventilating fan 34 which is mounted on the armature shaft 25 and revolves within the circular frame or casing 7.

When current is turned on, the fan is rapidly revolved and a current of cooling air is thereby induced into and through the motor, this cooling current of air flowing upwardly through the pipe section and the opening 28 in the field frame 21, and around the armature and the field magnets, and thence through the outflow opening 29, whereby the heat generated within the motor is rapidly abstracted and carried off.

The pipe 16, located and applied as described, not only serves the function of a conductor for the cooling air, but also constitutes one of the supporting arms of the motor and motor frame, taking the place of one of the supporting arms 11 heretofore employed in addition to the air supply pipe. This conduces to economy of both material and space.

The outer hood or cover 30 permits the employment of a supporting frame for the outer end of the armature shaft, having sufficiently large openings to afford access to the commutator brushes when the cover is removed, thus making it unnecessary to disturb the outer bearing in order to get at and replace the commutator brushes as required.

It is believed that the novel structural features and the practical advantages of the invention will be apparent from the foregoing in connection with the illustration, and without requiring further detail description. I make no claim herein to the feature of conducting a current cooling air into the field of an electric motor, otherwise than in combination with other structural features of special value and utility in a motor of the type and for the purposes herein described, and as set forth in the following claims.

I claim:

1. The combination, with a multi-polar electric motor having a circular field frame formed with a radial hole therein between adjacent poles, of a motor-supporting ring embracing said field frame and formed with a radial hole registering with the hole of the latter, a pipe for the induction of cooling air communicating with the hole of said ring, a cover secured to one side of said field frame and having a hole for the outflow of heated air, a skeleton frame piece secured to the other side of the field frame around the commutator of the motor, and a removable cover surrounding and enclosing said skeleton frame piece.

2. The combination, with a multi-polar electric motor having a circular field frame formed with a radial hole therein between adjacent poles, of a motor-supporting ring embracing said field frame and formed with a radial hole registering with the hole of the latter, a pipe for induction of cooling air communicating with the hole of said ring, a cover secured to one side of said field frame and carrying a bearing for one end of the armature shaft of the motor, said cover having a hole for the outflow of heated air, a skeleton frame piece secured to the other side of the field frame around the commutator of the motor and carrying a bearing for the other end of the armature shaft, a removable cover surrounding and enclosing said skeleton frame piece, and means for locking said last-named cover in place.

3. The combination, with a horizontally disposed multi-polar electric motor having a circular field frame formed with a radial hole at its lowest point between adjacent poles, of a motor-supporting ring embracing said field frame and formed with a radial hole registering with the hole of the latter, a plurality of radially disposed arms attached at their inner ends to said ring through which said motor is adapted to be mounted on a vertical wall, the lowermost of said arms consisting of a pipe for the induction of cooling air connected into the hole of said ring, a cover secured to one side of said field frame and carrying a bearing for one end of the armature shaft of the motor, said cover having a hole for the outflow of heated air, a skeleton frame piece attached to the other side of the field frame around the commutator of the motor and carrying a bearing for the other end of the armature shaft, and a removable cover surrounding and enclosing said skeleton frame piece.

ROBERT A. ILG.